US005212883A

United States Patent [19]

Folk et al.

[11] Patent Number: 5,212,883

[45] Date of Patent: May 25, 1993

[54] CABLE MAKER HAVING CONDUCTOR PULLER FOR WIRE FEEDING

[75] Inventors: Kenneth F. Folk; Craig W. Hornung, both of Harrisburg, Pa.

[73] Assignee: AMP Incorporated, Harrisburg, Pa.

[21] Appl. No.: 871,251

[22] Filed: Apr. 20, 1992

[51] Int. Cl.[5] ........................ B23P 19/00; B23P 19/02

[52] U.S. Cl. ........................................ 29/749; 29/759; 29/760; 269/903

[58] Field of Search ................. 29/749, 755, 759, 760, 29/828, 868, 876; 269/43, 903

[56] References Cited

U.S. PATENT DOCUMENTS

| | | | |
|---|---|---|---|
| 3,029,494 | 4/1962 | Andren | 29/828 |
| 4,651,413 | 3/1987 | Maack et al. | 29/749 |
| 4,815,207 | 3/1989 | Schwartzman | 29/828 |

*Primary Examiner*—Joseph M. Gorski

*Assistant Examiner*—K. V. Nguyen

*Attorney, Agent, or Firm*—Fritz Raring; Robert J. Kapalka

[57] ABSTRACT

Conductor feeding apparatus for selectively feeding conductors selected from a group or from feeding all of the conductors in the group comprises first and second clamping assemblies which are moveable towards and away from each other between remote and proximate positions. Each clamping assembly has a clamp for each one of the conductors. When it is desired to feed selected conductors, the selected conductors are clamped in the first clamping assembly and the non-selected conductors are clamped in the second clamping assembly. The second clamping assembly is moved towards the first clamping assembly so that the ends of the selected conductors project beyond the second clamping assembly. The projecting ends are gripped in a conductor puller and pulled along the feed paths.

8 Claims, 18 Drawing Sheets

CABLE MAKER HAVING CONDUCTOR PULLER FOR WIRE FEEDING

FIELD OF THE INVENTION

This invention relates to cable makers having conductor pullers for feeding the cable conductors. The invention particularly is concerned with a cable maker which does not distort co-axial conductors during the feeding operation and which has the capability of feeding a selected group of conductors which are selected from a plurality of conductors.

BACKGROUND OF THE INVENTION

Some types of electrical equipment, such as computers, require coaxial conductors for the multiconductor cables used in the equipment. Co-axial conductors comprise a center conductor surrounded by a layer of insulation, a shielding layer, and an outer covering layer which is over the shielding layer. The cross section of a coaxial conductor is circular and symmetrical about the central conductor. It is essential that the symmetry not be disturbed if the co-axial conductor is to have the required electrical characteristics. Many wire feeders compress conductors between feed wheels during the feeding operations and for that reason are not suitable for feeding coaxial conductors. In accordance with one aspect thereof the invention is directed to the achievement of a wire feeder for co-axial conductors which does not disturb the symmetry of the conductors during the feeding operation.

In accordance with another aspect thereof, the invention is directed to the achievement of a feeding apparatus which is capable of feeding a plurality of wires and which is also capable of feeding only selected wires from the plurality. This aspect of the invention is important in manufacturing processes in which a series of cables are produced as required and the cables are not all of the same length and do not have the same number of conductors therein. In other words, identical cables are not produced serially but are rather produced one at a time in order to satisfy the requirements of a manufacturing process in which cables of different lengths and having different numbers of conductors are produced in the order needed.

THE INVENTION

The cable maker of the present invention comprises a conductor feeder for feeding a plurality of conductors from endless sources along conductor feed paths. The feeder has the capability of feeding all of the conductors simultaneously, the capability of feeding only selected conductors, and the capability of feeding only one conductor. The feeder comprises a conductor puller, first and second conductor clamping assemblies, and a control system. The feed paths extend from the conductor sources through the first and second clamping assemblies and beyond the second clamping assembly. The first clamping assembly is upstream, relative to the direction of conductor feeding from the second clamping assembly. The feed paths are parallel and coplanar in the clamping assemblies and in the portions which extend beyond the second clamping assembly. The first clamping assembly has a conductor outlet end and the second clamping assembly has a conductor inlet end and a conductor outlet end. The outlet end of the first clamping assembly is opposed to the inlet end of the second clamping assembly. The first and second clamping assemblies are movable relatively towards and away from each other between remote positions and proximate positions. The outlet end of the first clamping assembly is proximate to the inlet end of the second clamping assembly when the clamping assemblies are in their proximate positions. The conductor puller has a conductor gripper for gripping the ends of the conductors and is reciprocable along the portion of the feed path which extends from the outlet end of the second clamping assembly. The control system has control means for selectively clamping the conductors in the first clamping assembly, for selectively clamping the conductors in the second clamping assembly, for moving the clamping assemblies between their remote and proximate positions, for opening and closing the gripping means on the conductor puller, and for moving the conductor puller along its path of reciprocation. In operation, at the beginning of the operating cycle the clamping assemblies will be in their remote positions and the conductors will extend from the sources through the clamping assemblies with the ends of the conductors at the outlet end of the second clamping assembly. The conductors are fed by clamping the selected conductors in one of the clamping assemblies, clamping the non-selected conductors which are not to be fed, in the other clamping assembly and moving the clamping assemblies to their proximate positions so that the end portions of the selected conductors extend beyond the outlet end of the second clamping assembly. The ends of the projecting selected conductors are then gripped in the gripping means and the selected . conductors are unclamped in the one clamping assembly. The conductor puller is moved along its path of reciprocation away from the second clamping assembly whereby the selected conductors are pulled along the feed path.

The method of the invention comprises the steps of positioning the end portions of all of the conductors in a selection zone in parallel side-by-side coplanar relationship with the conductor ends of all of the conductors in alignment in a plane which extends normally of the axes of the conductors. The end portions of the selected conductors are moved axially relative to the end portions of the non-selected conductors so that the end portions of the selected conductors extend along the feed paths beyond the end portions of the non-selected conductors. The end portions of the selected conductors and then gripped and pulled along the feed paths thereby to feed the required length of the selected conductors. After the conductors have been pulled along the path, they are cut at a location adjacent to the end portions of the non-selected conductors.

THE DRAWING FIGURES

THE DISCLOSED EMBODIMENT

Figure 1:
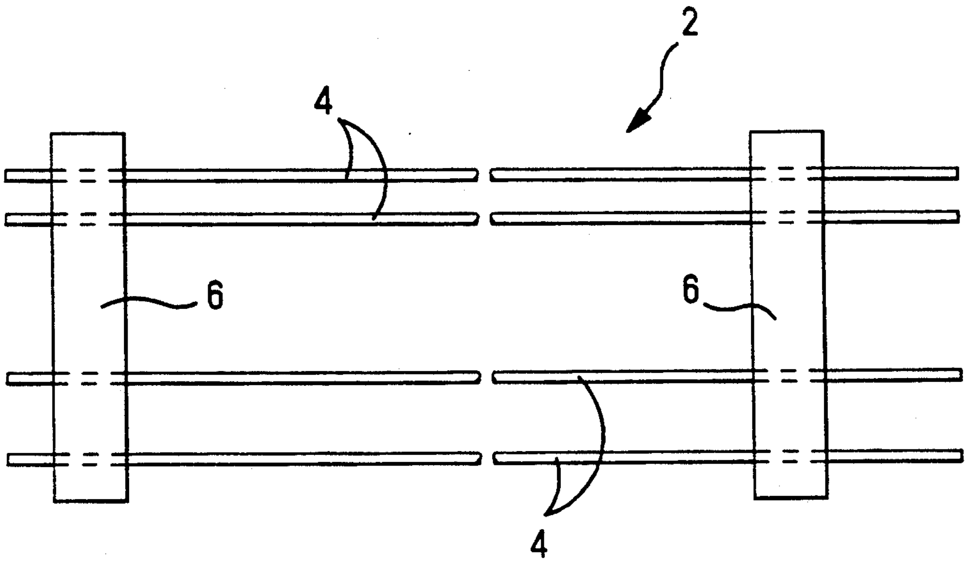
FIG. 1 is a plan view of a cable produced by the practice of the invention.
Figure 2:
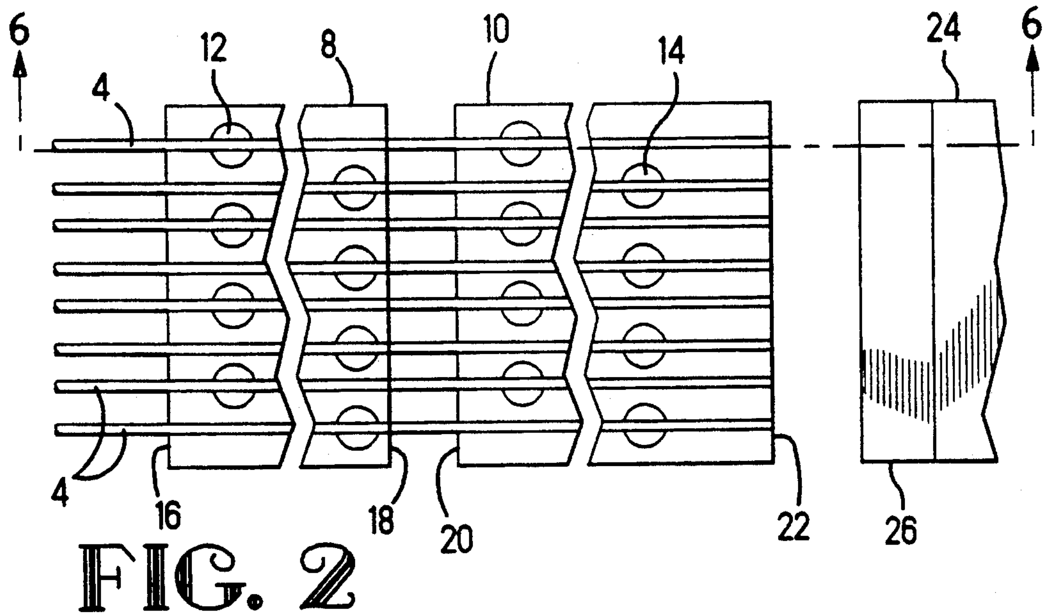
FIG. 2 is a diagrammatic plan view showing the essential elements of an apparatus for the practice of the invention, this view showing the positions of the parts at the beginning of an operating cycle.
Figure 3:
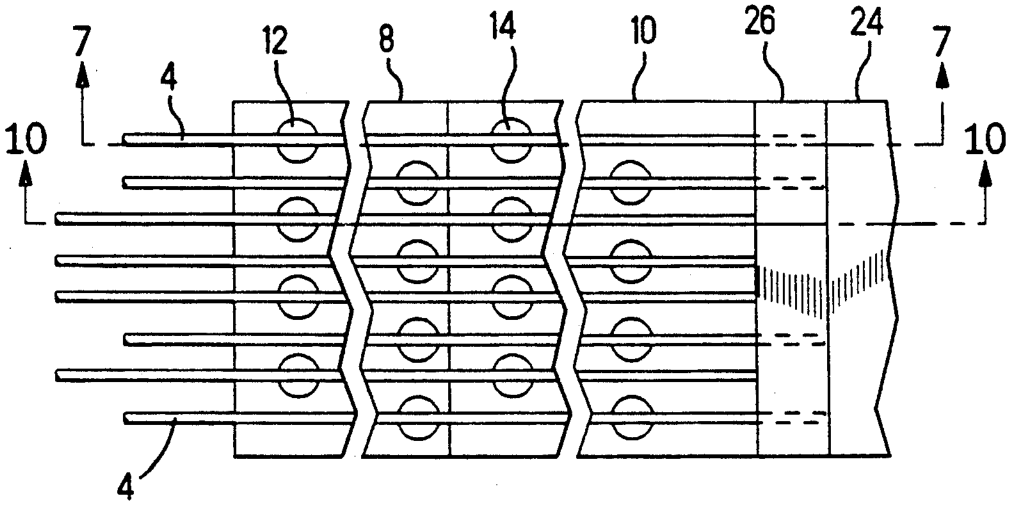
FIGS. 3–5 are views similar to FIG. 2 but showing the positions of the part showing successive stages of the operating cycle.

FIG. 1 shows a cable 2 produced by the diagrammatically illustrated embodiment of the invention shown in FIGS. 2-10. The cable comprises a plurality of spaced apart parallel coaxial conductors 4 which are held in the position shown by flexible adhesive tapes 6 applied to the conductors at each end thereof. The cable 2 has only four conductors and the spacing between the conductors is no uniform but is irregular. The apparatus is capable of producing a cable having a total of eight conductors or any number of conductors less than eight.

The apparatus comprises first and second conductor clamping assemblies 8,10, each clamping assembly having individual wire clamps 12,14 for each one of the conductors 2. The first wire clamping assembly has an inlet end 16 and an outlet end 18. The second clamping assembly has an inlet end 20 and an outlet end 22. A conductor puller 24 having gripping jaws 26 is located adjacent to the outlet end 22 of the second clamping assembly 10 and is movable in the manner shown in FIGS. 2-5.

Figure 4:
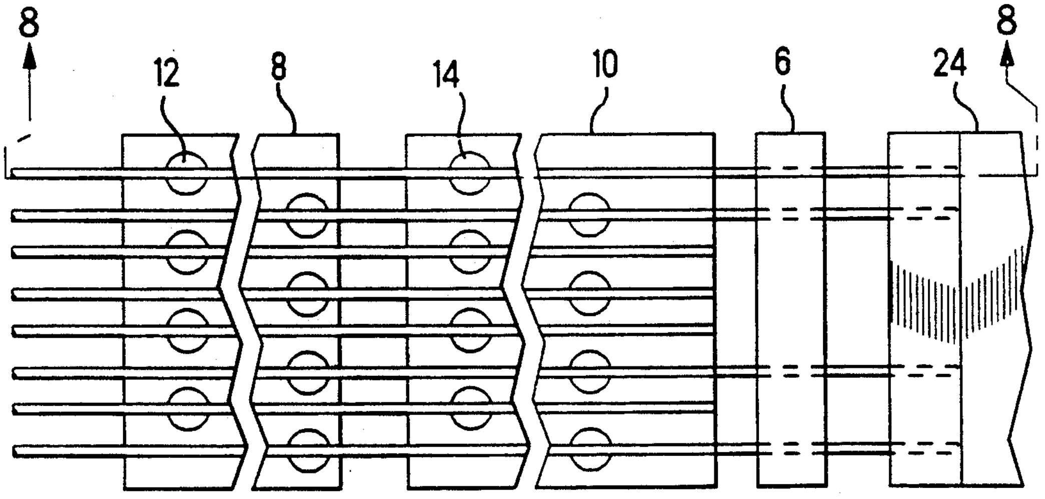
Figure 5:
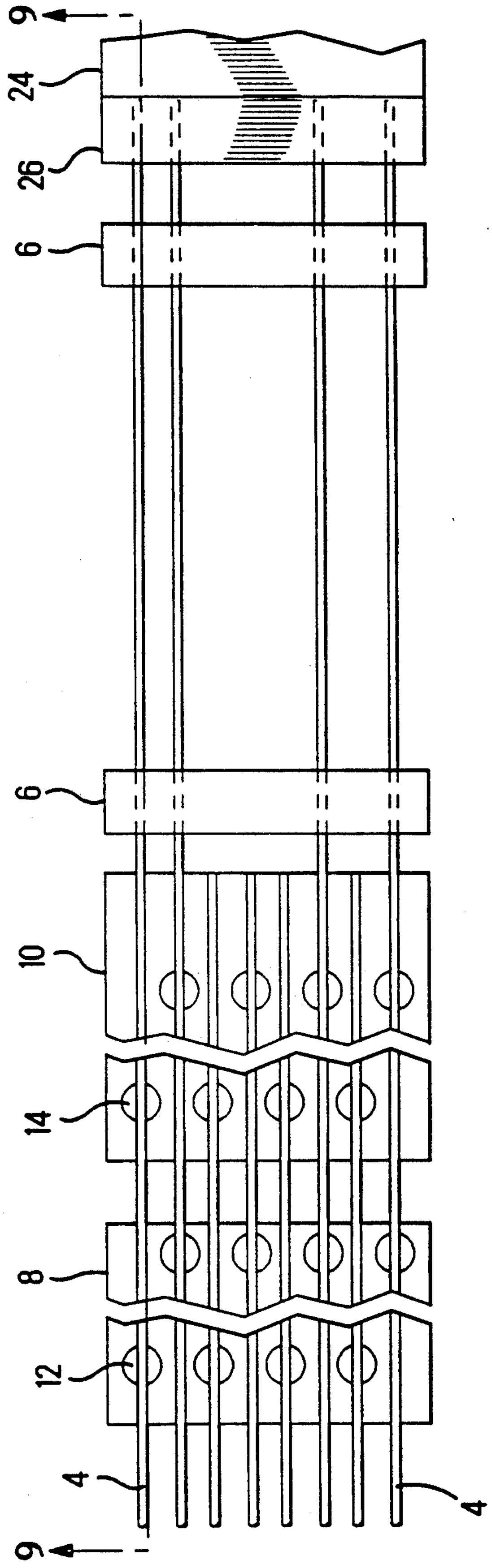
Figure 6:
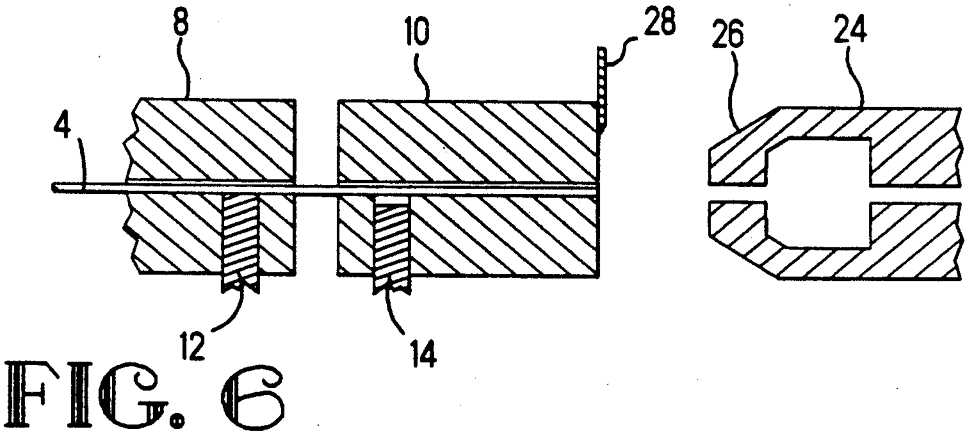
FIGS. 6–10 are sectional views looking in the direction of the arrows of the corresponding section lines in FIGS. 2–5.
Figure 7:
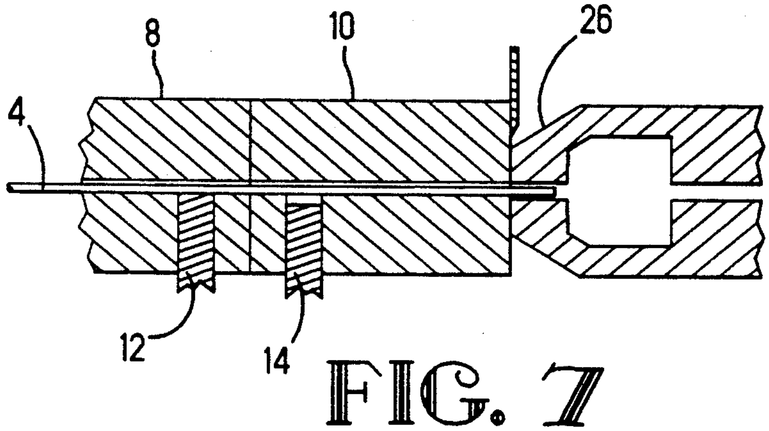
Figure 8:
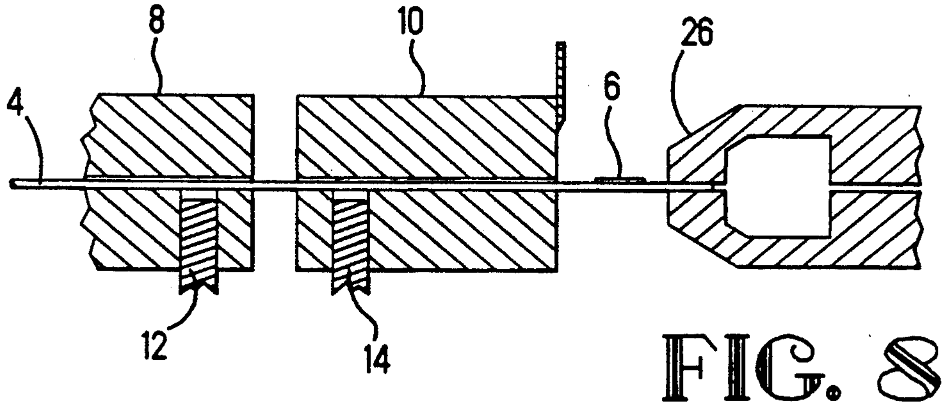
Figure 9:
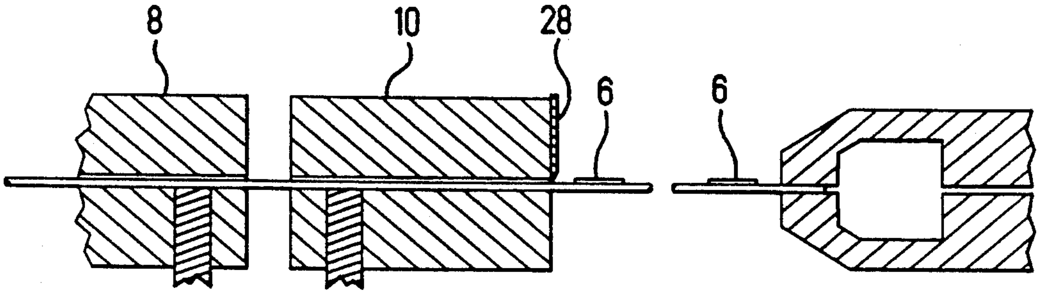

During a complete- operating cycle, the conductors which are to be fed, the selected conductors, are clamped in the first clamping assembly 8 but are not clamped by the clamping members 14 in the second clamping assembly 10. The non-selected conductors are clamped in the second clamping assembly 10 but are not clamped in the first clamping assembly 8. During the operating cycle, the wire puller 24 moves leftwardly from the position shown in FIG. 2 and pushes the second clamping assembly 10 from a first remote position to a second proximate position so that the end portions of the four selected conductors are located between the open jaws 26 of the wire puller as shown in FIG. 7. The clamps 12 in the first clamping assembly 8 are then opened so that the selected conductors are not clamped in either of the clamping assemblies and the puller moves rightwardly, FIGS. 4 and 8, and pauses so that a section of tape 6 can be installed on the conductors 4 to maintain them in their positions. Thereafter the puller moves rightwardly to the end of its stroke, FIGS. 5 and 9, and a second piece of tape 6 is applied to the ends adjacent to the second clamping assembly. The clamping assemblies 8,10 move back to their remote positions as shown in FIG. 4 when the puller moves away from the outlet end 22 of the second clamping assembly. The conductors are then severed by a shearing mechanism 28 shown in FIG. 9.

Figure 10:
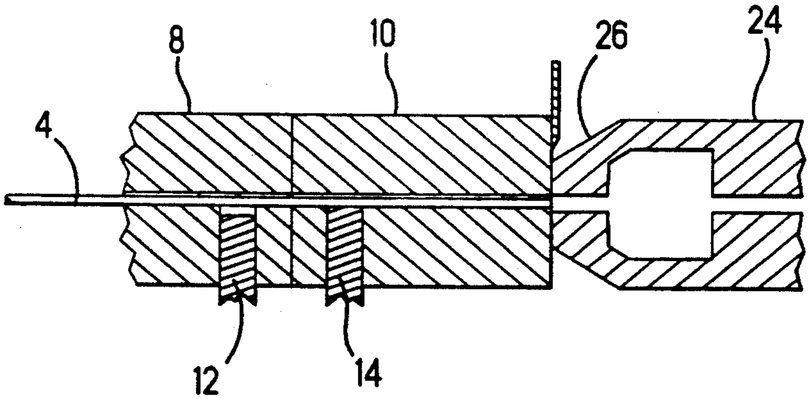

FIGS. 6-9 are taken along section lines which illustrate the movement of a selected conductor and FIG. 10 shows the positioning and clamping of a nonselected conductor during the operating cycle. When the second clamping assembly moves leftwardly from the position of FIG. 2 to the position of FIG. 3, the non-selected conductors are moved a short distance upstream, relative to the direction of conductor feeding, so that their ends remain at the outlet end 18 of the second clamping assembly.

Figure 11:
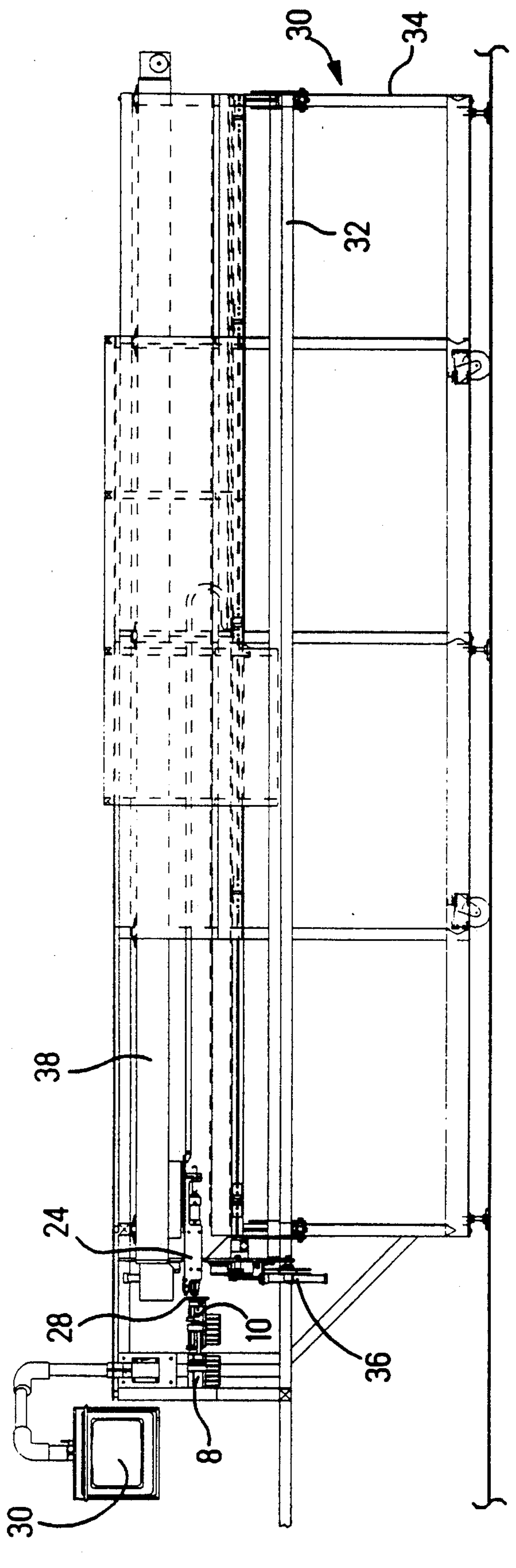
FIG. 11 is a side view of an apparatus in accordance with the invention.
Figure 12:
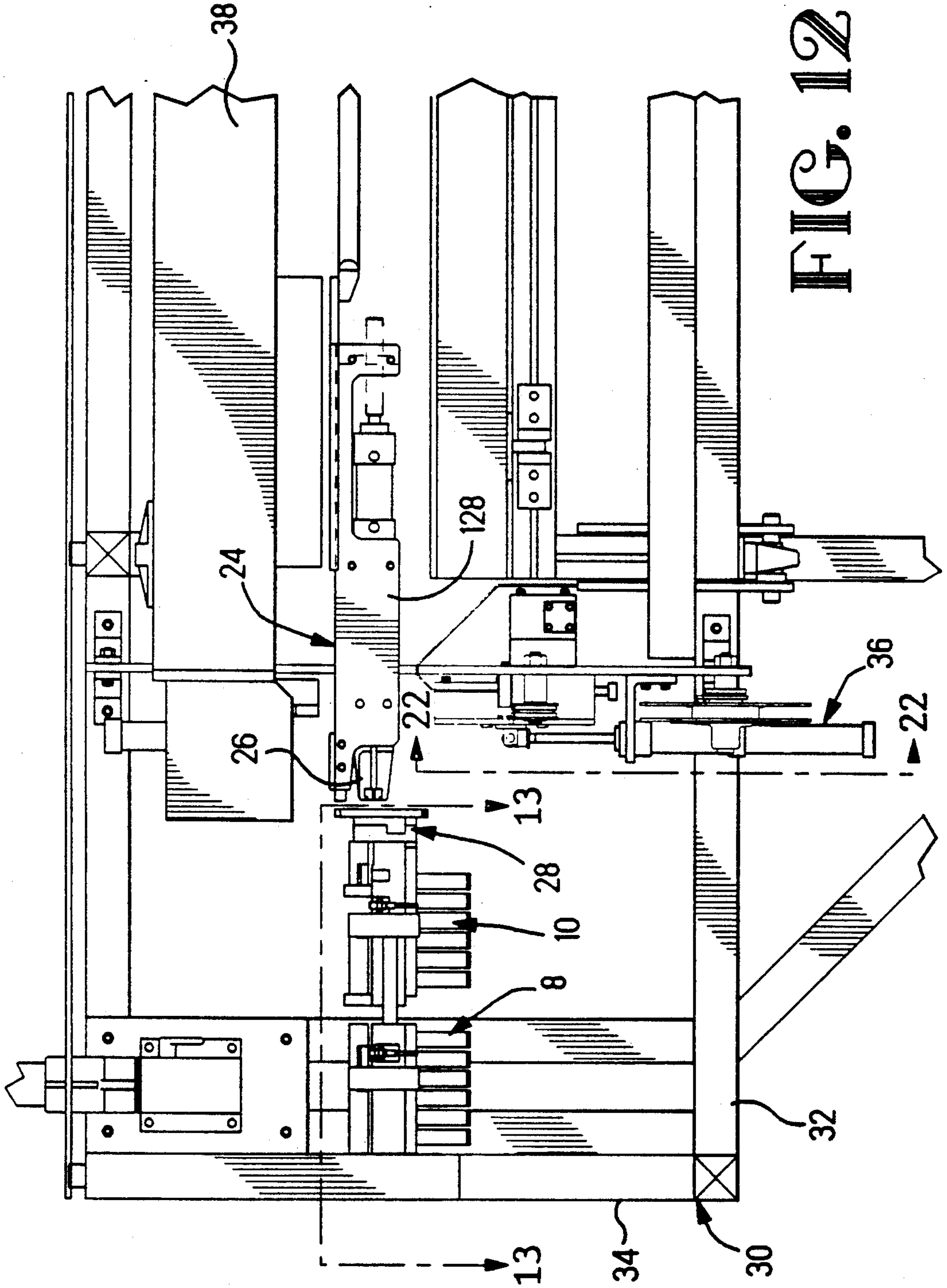
FIG. 12 is a view of the left-hand portion of the apparatus on an enlarged scale.
Figure 13:
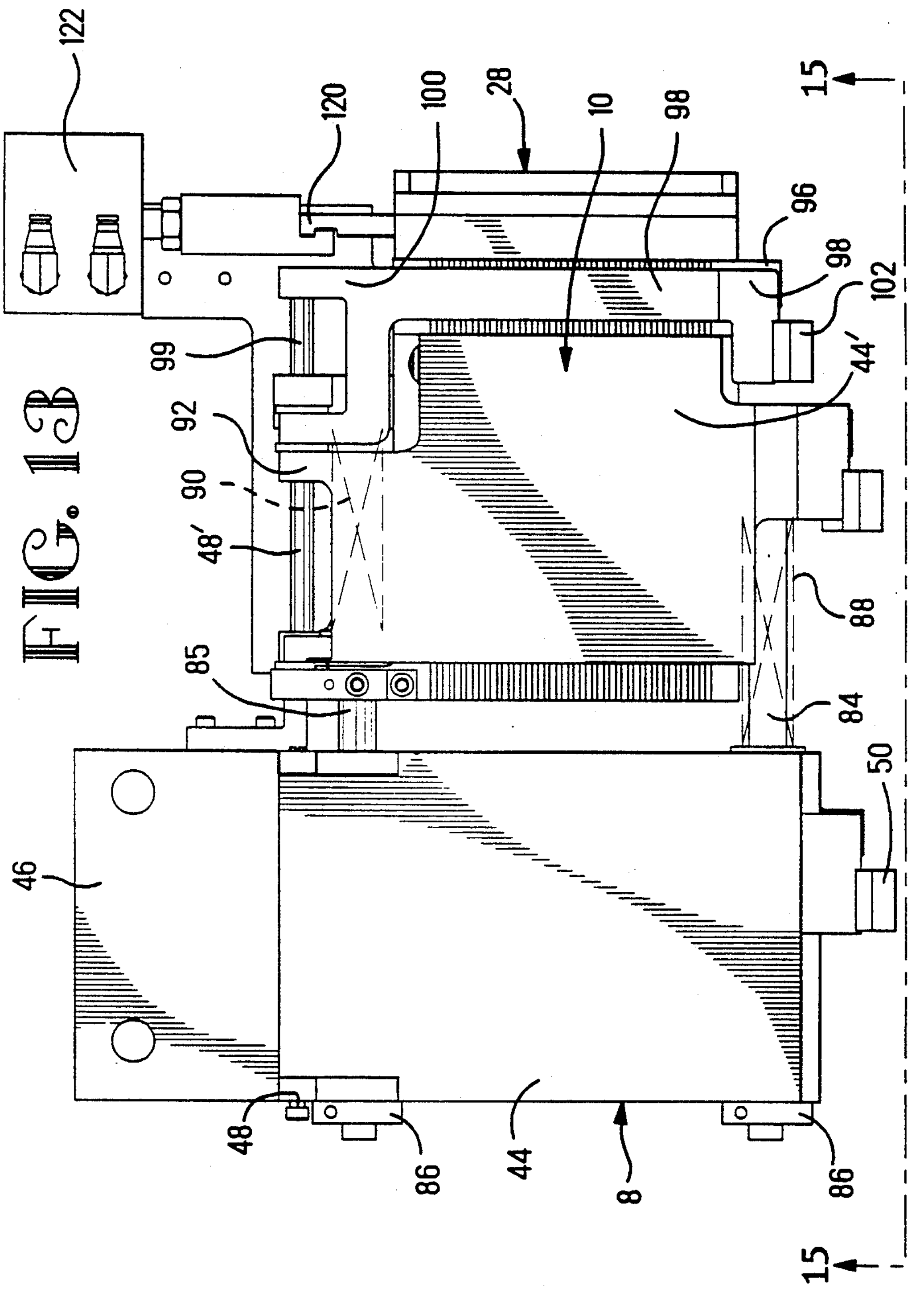
FIG. 13 is a plan view of the wire clamping assemblies looking in the direction of the arrows 13—13 of FIG. 12.
Figure 14:
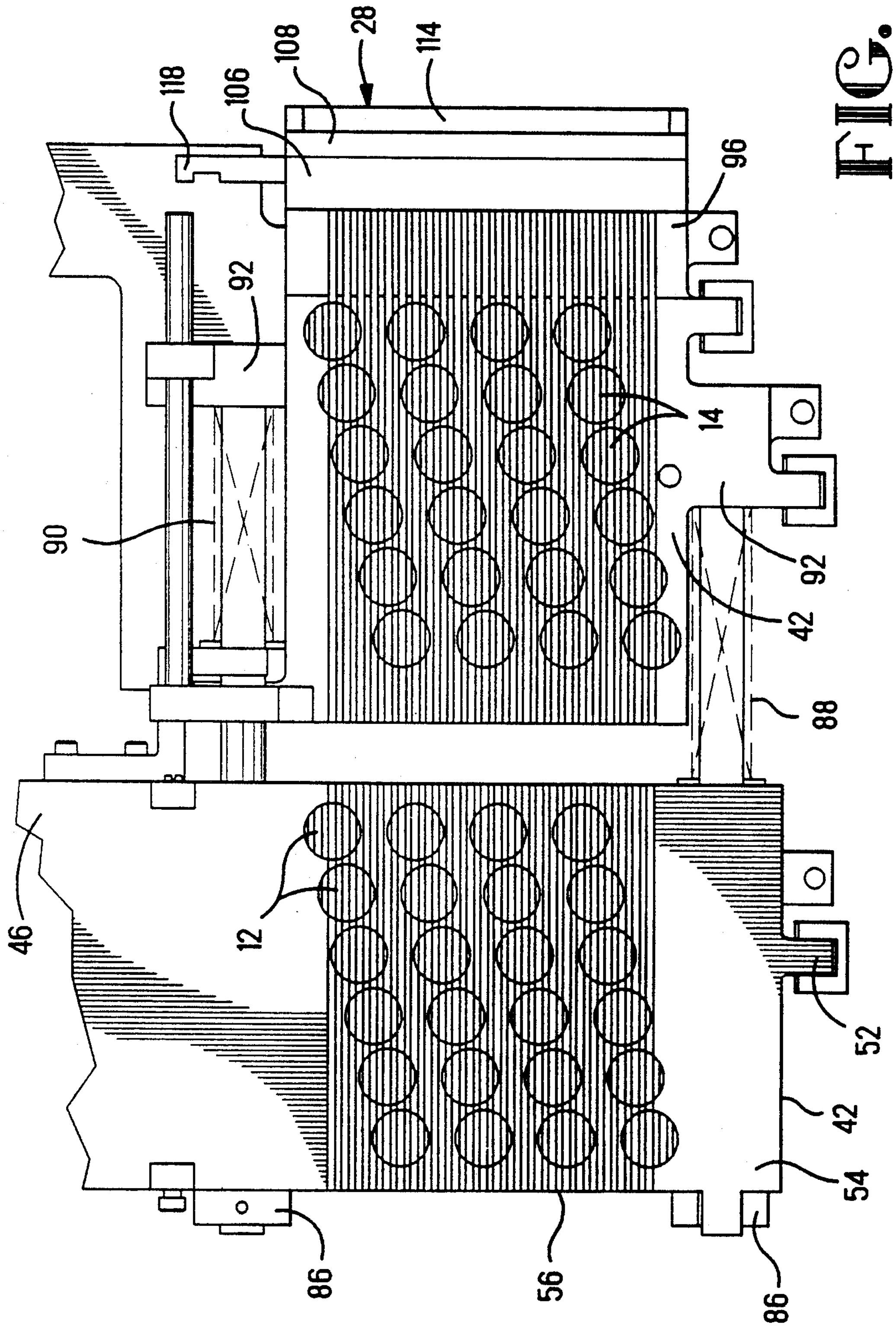
FIG. 14 is a view similar to FIG. 13 but showing the clamping assemblies with their upper sections in their open position.
Figure 15:
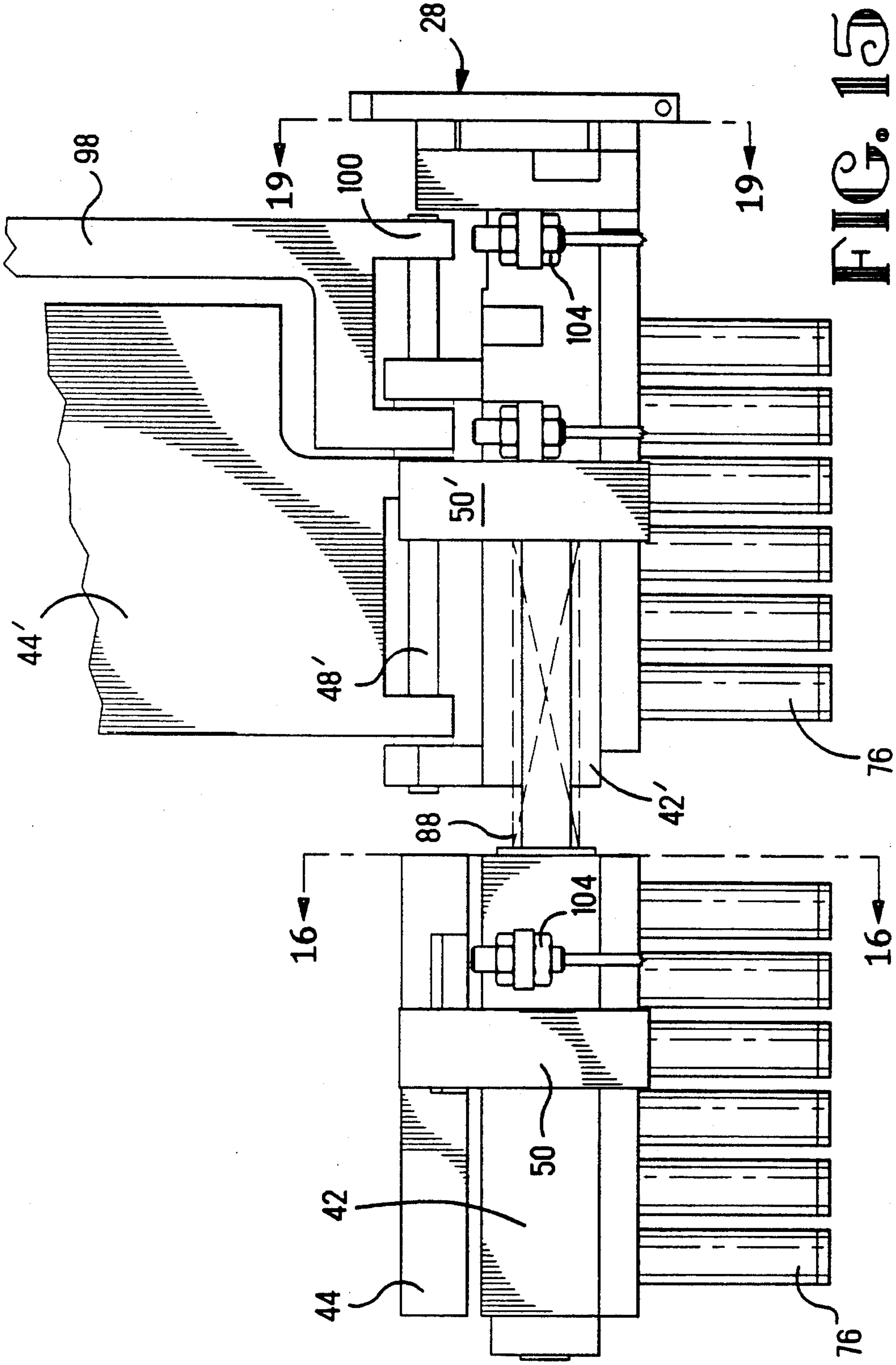
FIG. 15 is a view looking in the direction of the arrows 15—15 of FIG. 13.
Figure 16:
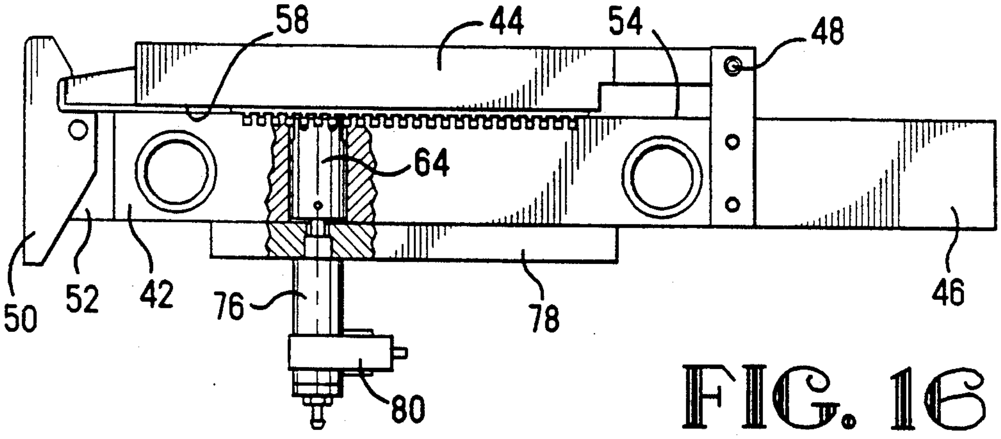
FIG. 16 is a view looking in the direction of the arrows 16—16 of FIG. 15.
Figure 17:
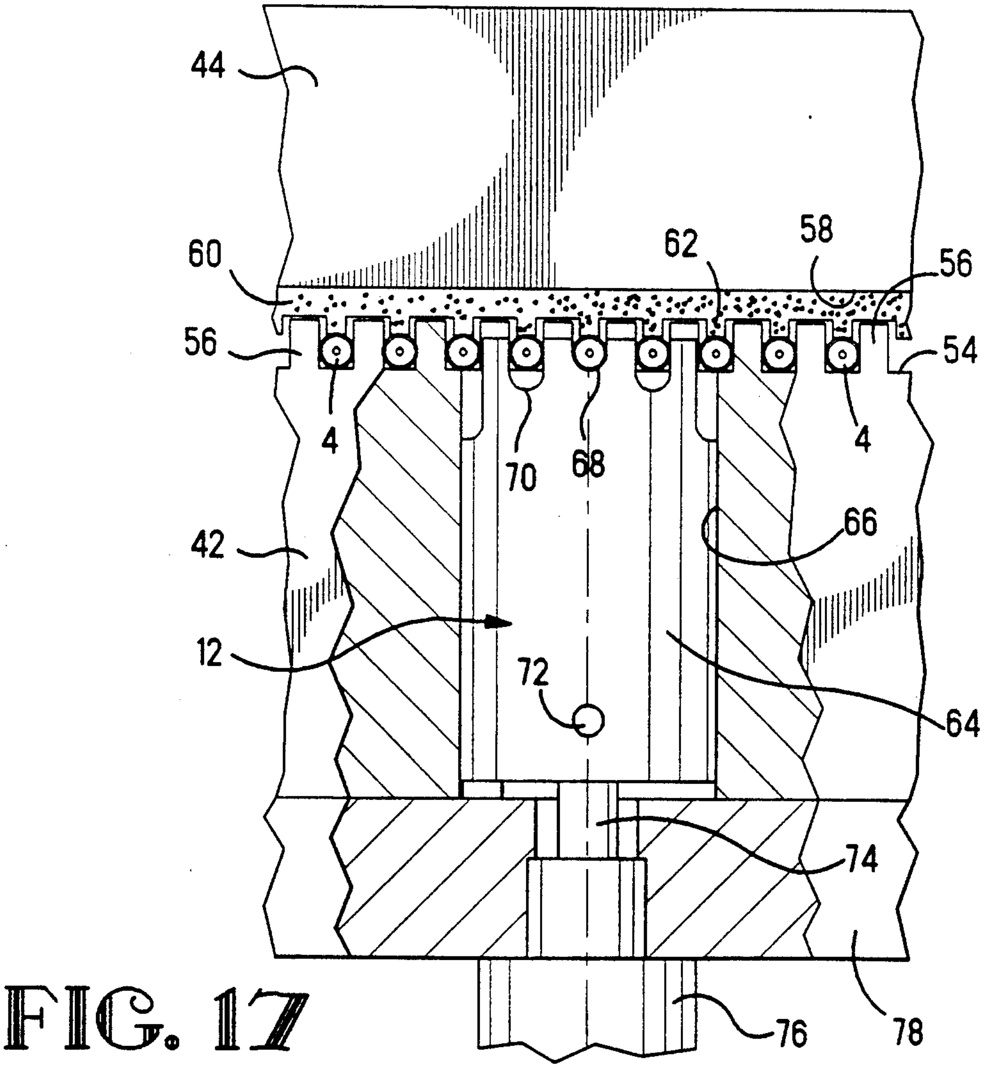
FIG. 17 is a view of an enlarged scale similar to FIG. 16 and showing details of one of the conductor clamps.

The embodiment of the invention shown in FIGS. 11-23 has the capability of feeding up to twenty-four conductors but otherwise has the essential elements described above and shown in the diagrammatic views. The apparatus comprises a frame assembly 30 having horizontal and vertical frame members 32,34. The first and second clamping assemblies 8,10 are located on the frame adjacent to the left-hand end thereof. The taping assembly 36, for applying the tapes 6 to the cable, is supported on the frame adjacent to the second clamping assembly. The conductor puller 24 is carried by an actuator 38 which is movable along the length of the frame from the position shown in FIG. 11 rightwardly. A touch screen 30 is provided on the frame to permit the operator to provide the instructions to the control system which are required for an operating cycle.

The first clamping assembly 8, FIGS. 13-17, comprises a composite rectangular block having a lower section 42 and an upper section 44. The block is supported on the frame by means of an arm 46 and the upper section 44 is pivoted on an axis 48 so that it can be raised relative to the lower section. A latch 50 is provided on an ear 52 on the lower section 42 so that the two sections can be latched in their closed condition, see FIG. 16. The upper surface 54 of the lower section 42 has a plurality of spaced apart parallel ribs 56. The spacing between adjacent ribs is substantially equal to the diameter of an individual conductor 4 so that the conductors will be confined between the ribs but will not be distorted or compressed. The lower or downwardly facing surface 58 of the upper section 44 has a soft pad 60 of elastomeric material, such as polyurethane, bonded thereto. This pad has spaced apart ribs 62 extending therefrom which are of a width less than the distance between adjacent ribs 56 and the lower section. The ribs 62 do not clamp the conductors but merely confine them so that they can move freely through the passageways defined by the ribs 56 and ribs 62.

Figure 18:
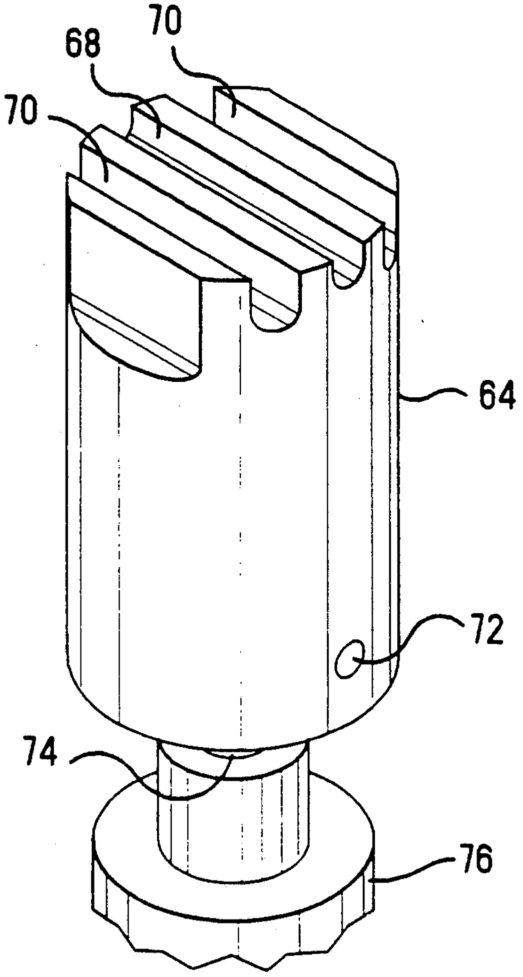
FIG. 18 is a perspective view of a conductor clamping member.

Each of the clamps 12 comprises a cylindrical clamping member 64, FIG. 18, which is slideably contained in a cylindrical opening 66 in the lower section 42 of the clamping assembly. Each clamping member has a central relatively shallow channel 68 extending thereacross and has deeper channels 70 on each side of the central channel 68. The cylindrical clamping member is coupled at 72 to the reduced diameter end 74 of a piston cylinder 76. The cylinders for all of the clamps are mounted in a plate 78 which is secured to the underside of the block section 42 and a sensor 80 is provided for each cylinder to determine its condition.

The individual conductors are clamped by pressurizing the cylinders thereby to cause the clamping members 64 to move a short distance upwardly. The conductor which is in the central channel 68 is lightly clamped between the rib 62 and the bottom of the channel 68. The other conductors which are in alignment with the channels 70 are not clamped since these channels are deeper than channel 68.

The conductor 4 which is clamped is only very lightly clamped so that the conductor is not distorted or compressed. Because of the large diameter of the clamping member 64, the conductor is lightly clamped along a substantial portion of its length and it does not move when the clamping assemblies 8,10 move relatively towards or away from each other. The long clamping area is desirable because of the fact that the clamping pressure is very low.

The second clamping assembly 10 is similar to, but not identical to, the first clamping assembly and need not be described in detail. The same reference numerals, differentiated by prime marks, are used to identify the structural features of both of the clamping assemblies where appropriate.

The clamping assemblies are normally maintained in their remote positions relative to each other by springs 88,90 which surround guide rods 84,85. The rods are mounted in ears 92 on the second clamping assembly 10 and extend slideably through the first clamping assembly 8. These rods have collars 86 on their ends which maintain the clamping assemblies in their remote positions. When the second clamping 10 assembly is moved toward the first clamping assembly 8, the movement is relatively slight and the two clamping assemblies do not actually move against each other as shown in the diagrammatic views, FIGS. 2-6.

The second clamping assembly has an extension 96 on its right hand end which and has an auxiliary clamp 98 which is pivoted by ears 100 on an extension 99 of pivot axis 48'. A latch 102 is provided for clamping the auxiliary clamp in its closed position.

This auxiliary clamp 98 is normally open, that is, normally in its raised condition when the machine is operating. This clamp is provided for the reason that when it is necessary to open the first and second clamping assemblies 8,10, that is to raise the upper sections of the first and second clamping assemblies, the conductors would move relative to the clamping assemblies if they were not firmly clamped in the extension 96 of the second clamping assembly. Therefore, the clamping arm of the auxiliary clamp 98 is latched in its closed position when it is necessary to open the first and second clamping assemblies for servicing or cleaning.

Sensors 104 are provided at different locations on the clamping assemblies to determine whether or not they are open or closed and these sensors are connected to the control system.

Figure 19:
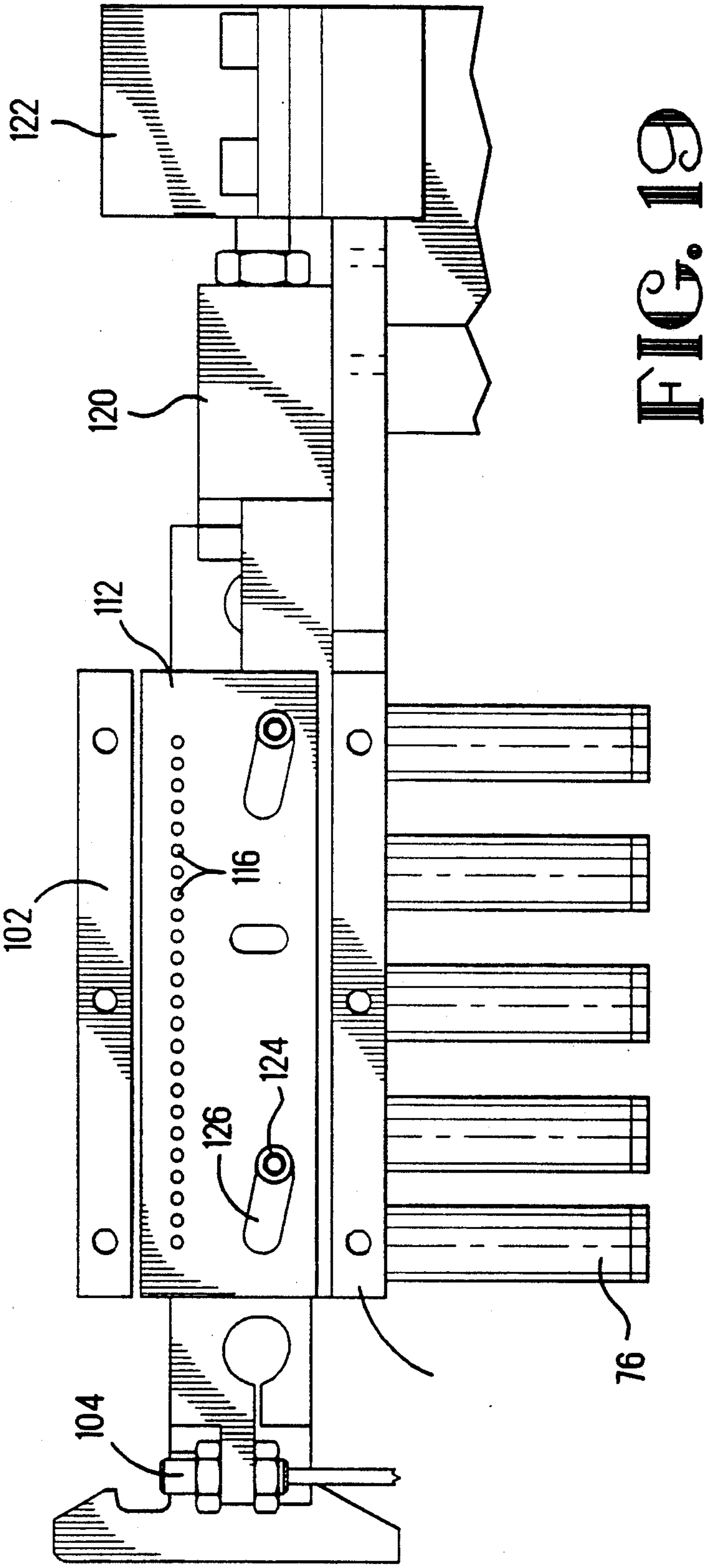
FIG. 19 is a view looking in the direction of the arrows 19—19 of FIG. 15 and showing portions of the conductor sharing mechanism.
Figure 20:
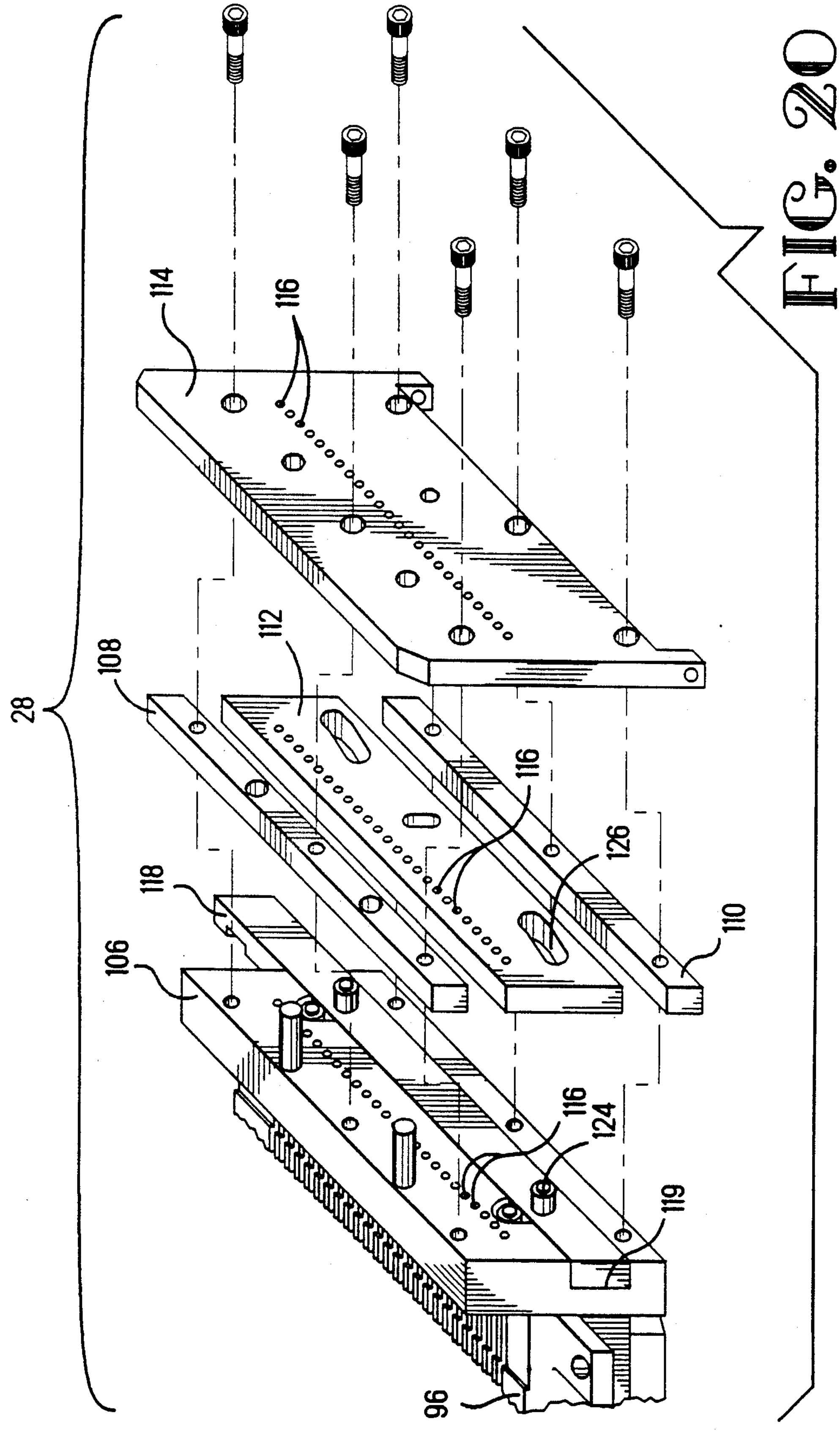
FIG. 20 is a perspective view, with the parts exploded, of the conductor sharing assembly.

The shearing means 28 for shearing the conductors, FIGS. 19 and 20, comprises a mounting plate 106 which is secured against the extension 46 of the second clamping assembly. Upper and lower spacers 108,110 are mounted on mounting plate 106 and a slide 118 is slideably contained in a channel 119 which is between the spacers. The slide is coupled by a coupling 120 to a piston cylinder 122. The moveable shear plate 112 is between the spacers 108,110 and a fixed shear plate 114 which is secured by fasteners as shown. All of the plates and the slide have aligned openings 116 for the conductors. The movably shear plate 112 is moved a short distance by pins 124 which are on the slide 118 and which extend into inclined slots 126 in the moveable shear plate 112. When the slide 118 is moved a short distance, it causes the moveable shear plate 112 to move relative to the fixed shear plate and the conductors are severed.

Figure 21:
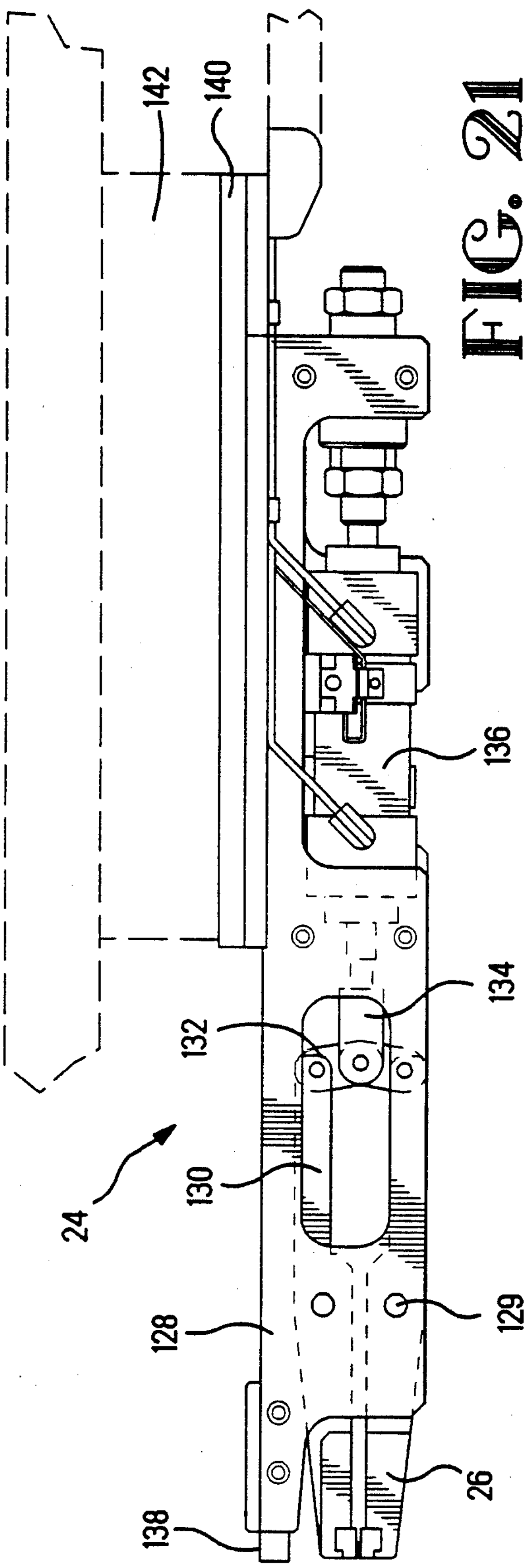
FIG. 21 is a side view of the conductor puller assembly.

The puller 24, FIG. 21, comprises a housing having side plates 128 in which the jaw assembly is contained. Each of the jaws has an extension 130 which extends rightwardly as viewed in the drawing and these extensions are pivotally connected by links 132 between the arms of a clevis 134 which in turn extends from a double acting piston cylinder 136. Jaws 26 are pivoted intermediate the in end to the frame at 129. When the piston rod and the arms 134 are moved a short distance leftwardly from the position shown, the jaws will move towards each other and clamp the conductors. A rubber or other soft material bumper 138 is provided on the housing in order to absorb the impact of the wire puller when it moves against the fixed shear plate.

The puller assembly is secured by mounting plates 140 to the carriage 142 of a linear actuator which moves along the feed path and parallel to the feed path thereby to move the wire puller along the feed path. The linear actuator can be of any suitable commercial type. The actuator shown is sold under the name Rapidtrak by the Motor Controls Systems Division of Warner Electric Co., 1300 N. State Street, Morengo, Ill. 60152.

Figure 22:
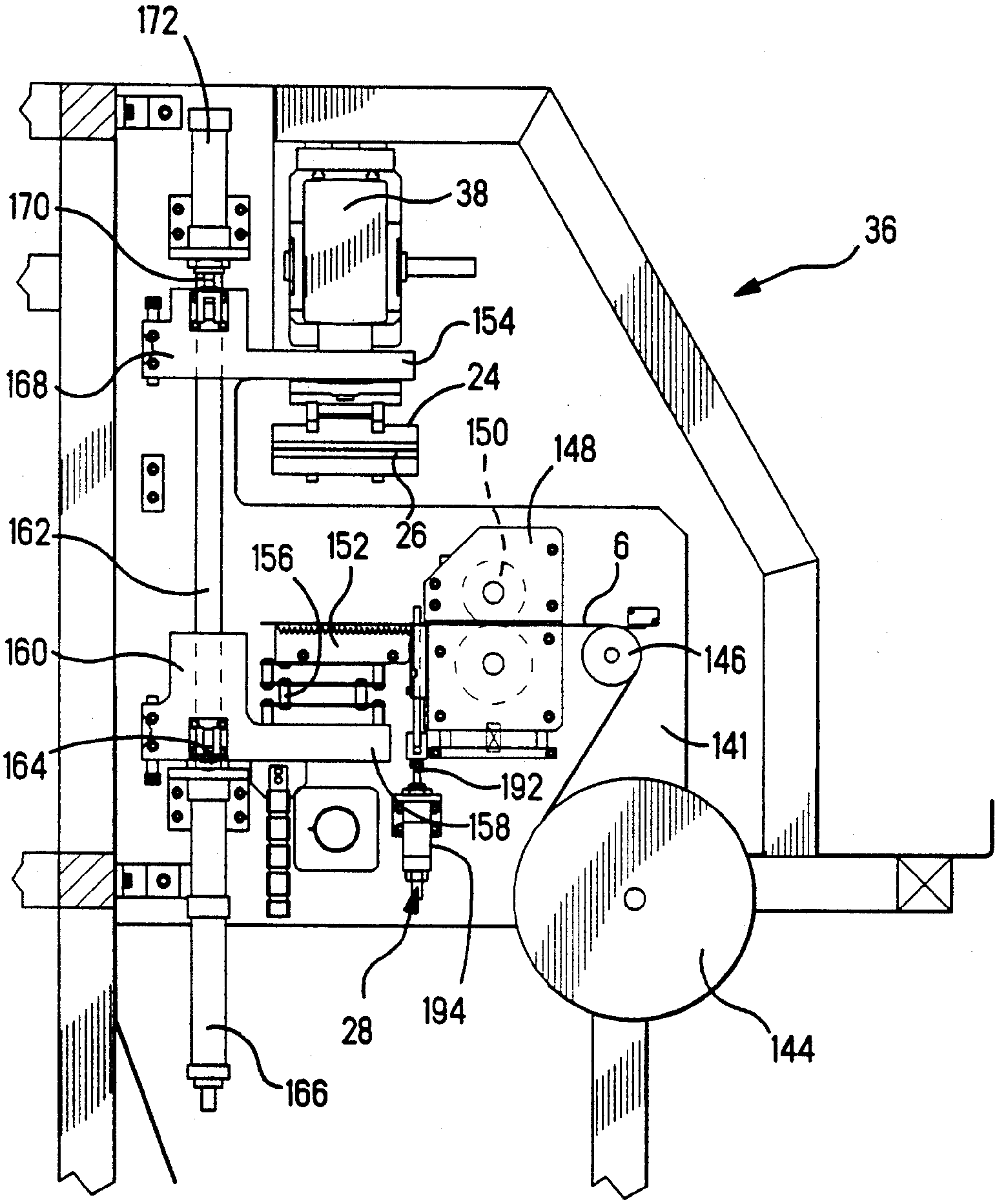
FIG. 22 is a view looking in the direction of the arrows 22—22 of FIG. 12 showing the taping mechanism for applying adhesive tape to the cables.
Figure 23:
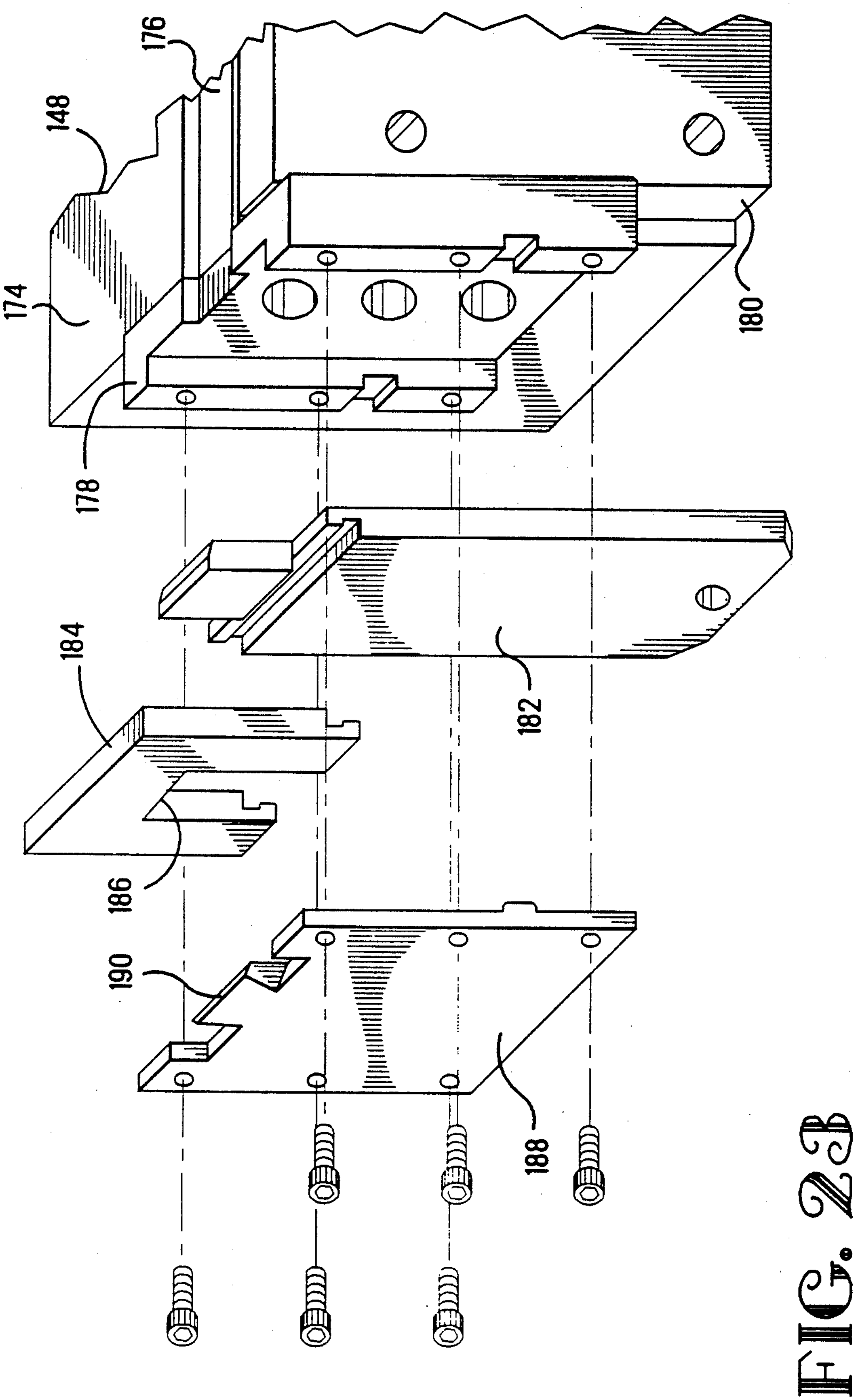
FIG. 23 is an exploded view of the tape cutter.

The tape applicator, FIGS. 22 and 23, is supported on a plate 141 which is secured to the frame in a plane that extends transversely of the feed paths for the conductor. The tape 6 is supplied on a spool 144 and is fed from the spool and over an idler roll 146. The feeding is accomplished by feed rolls 150 which are contained in a feed reel housing 148. The tape feed can be of any desired commercial type and is controlled by a DC motor so that short lengths of tape can be fed and the motor stopped when required. The tape is fed leftwardly as viewed in FIG. 22 past the shearing mechanism 28 and over the top surface of a heated platen 152. The platen is supported by spacers 156 which are designed such that they do not conduct heat. The spacers are supported on an arm 158 Which extends from a slide member 160 that is slideably supported on a rod 162. The slide member 160 is coupled to the piston rod by coupling members 164 of a piston cylinder 166. The tape is pressed against the conductors by means of an anvil or pressing member 154 which extends from an upper slide 168 which is coupled to a piston cylinder 172.

When the lower arm 158 is in its lowered position the surface of the platen 152 will be in alignment with the feed path for the tape 6 so that the tape can be fed over the surface of the platen. After the tape has been severed, as described below, the slide 160 is moved upwardly until the severed section of tape is brought into engagement with the selected conductors which have been fed beyond the outlet end of the second clamping assembly. Simultaneously, the slide 168 is lowered to lightly press the conductors against the heated tape. Thereafter the upper slide is moved upwardly and the lower slide 160 is moved downwardly. The upper slide is preferably provided with air jets so as to cool the heated tape and ėject the tape and the conductors from the lower surface of the upper slide.

The tape shearing mechanism, FIG. 23, is mounted against the leftwardly facing surface 180 of the feed roll housing 148. The tape is guided across the upper surface 174 of the housing through a channel 176. A shearing mechanism housing block 178 is secured against the surface 180 and has a central channel for reception of the movable shearing blade 184 which is U-shaped and which has a shearing edge 186 between the legs of the U. The shearing blade is coupled to a link 182 which in turn is coupled to the piston rod 192 of a piston cylinder 194. The fixed shear is provided by a plate 188 which extends over the moveable shear and over the link 182 and is secured by fasteners to the mounting plate 178. The fixed shearing edge 190 is located on the upper edge of plate 188 and in alignment with the channel 176 and the movable shearing edge 186.

Figure 24:
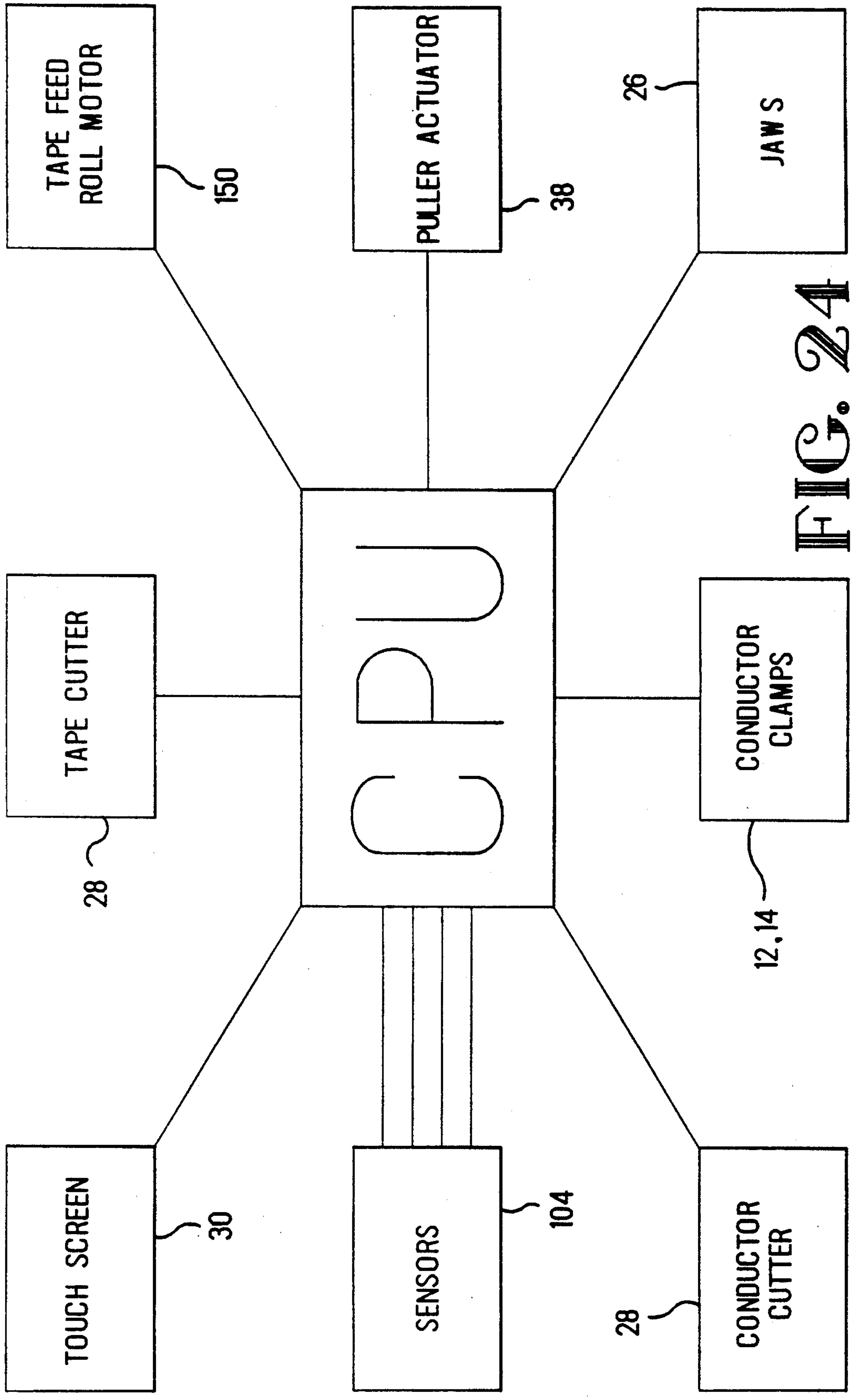
FIG. 24 is a block diagram of the control system for the apparatus.

The operation of the machine is essentially as described above with reference to FIGS. 2-10. The individual wire clamps, the shearing mechanism, the tape feed, the linear actuator, and the other components are under the control of a central processing unit, FIG. 24, which is connected by a cable to the touch screen. The central processing unit is also connected to all of the sensors and to the various piston cylinder control devices and electrical devices as described above and as indicated in the diagram.

The invention has two significant advantages over previously known wire feeding mechanisms. When wires or conductors are fed, they are not distorted or firmly clamped as they would be with feed wheels or similar feeding devices and co-axial conductors are not damaged as a result of the feeding process. Additionally, the feeder has the capability of feeding up to twenty-four individual conductors or feeding any of the conductors individually or any group of conductors desired.

We claim:

1. A conductor feeder for feeding selected ones of a plurality of conductors along parallel conductor feed paths from upstream sources to a downstream processing zone, comprising:

a first conductor clamping assembly having a plurality of first clamp members for releasably holding associated ones of the plurality of conductors with respect to the first clamping assembly;

a second conductor clamping assembly having a plurality of second clamp members for releasably holding associated ones of the plurality of conductors with respect to the second clamping assembly, the second clamping assembly being disposed downstream of the first clamping assembly along the conductor feed paths, the first and second clamping assemblies being relatively movable between a first position wherein said clamping assemblies are disposed remote from each other, and a second position wherein said clamping assemblies are disposed proximate to each other; and a conductor puller disposed downstream of said second clamping assembly, the conductor puller having a plurality of conductor grippers each associated with one of the plurality of conductors, the conductor puller being reciprocable along the conductor feed path toward and away from the second clamping assembly, the first clamp members being selectively operable to fixedly hold the selected conductors when said clamping assemblies are in the first position and to release the selected conductors when said clamping assemblies are in the second position, the second clamp members being selectively operable to fixedly hold the non-selected conductors during relative movement of said clamping assemblies between the first and second positions, said clamping assemblies being adapted to permit non-clamped conductors to pass through without engagement during movement between the first and second positions, whereby ends of the selected conductors are caused to extend downstream relative to ends of the non-selected conductors, and the conductor grippers being operable for gripping the extended ends of the selected conductors during movement of the conductor puller away from the second clamping member.

2. The conductor feeder according to claim 1, further comprising an automatic control system for controlling the selective operation of the first and second clamp members.

3. The conductor feeder according to claim 1, further comprising an automatic control system for controlling the relative movement of the first and second clamping assemblies between the first and second positions.

4. The conductor feeder according to claim 1, further comprising a shearing mechanism disposed along the conductor feed paths between the second clamping assembly and the conductor puller for shearing the selected conductors.

5. The conductor feeder according to claim 1, further comprising a holder applicator disposed downstream of the shearing mechanism for applying a holder to the selected conductors thereby to hold the selected conductors in fixed position relative to each other.

6. The conductor feeder according to claim 2, wherein each of the first and second clamp members is normally open, and the automatic control system is programmed to enable individual closing of each of the first and second clamp members.

7. The conductor feeder according to claim 1, further comprising a resilient member for biasing the first and second clamping assemblies to the first position.

8. The conductor feeder according to claim 7, wherein the first clamping assembly is fixed in position, and the conductor puller is urged against the second clamping assembly thereby moving the second clamping assembly from the first to the second position.

* * * * *